United States Patent [19]

Miyakawa

[11] Patent Number: 5,047,843
[45] Date of Patent: Sep. 10, 1991

[54] IMAGE READING METHOD

[75] Inventor: Tadashi Miyakawa, Kaisei, Japan

[73] Assignee: Fuji Photo Film Co., Ltd., Kanagawa, Japan

[21] Appl. No.: 378,099

[22] Filed: Jul. 11, 1989

[30] Foreign Application Priority Data

Jul. 13, 1988 [JP] Japan .................................. 63-174150

[51] Int. Cl.⁵ .............................................. H04N 1/46
[52] U.S. Cl. ........................................ 358/75; 358/77
[58] Field of Search ....................................... 358/75–80

[56] References Cited

U.S. PATENT DOCUMENTS

| 4,338,636 | 7/1982 | Yamada et al. | 358/75 |
| 4,570,187 | 2/1986 | Ono et al. | 358/75 |
| 4,809,061 | 2/1989 | Suzuki | 358/75 |
| 4,823,289 | 4/1989 | Hirosawa et al. | 358/75 |
| 4,855,818 | 8/1989 | Morimoto et al. | 358/75 |

Primary Examiner—Howard W. Britton
Assistant Examiner—Michael H. Lee

[57] ABSTRACT

An image reading method for the case where an original image is read by main scannings and auxiliary scannings of lines and the read image is exposed and outputted as an output image onto a photosensitive material. When the photosensitive material may be a variety of sizes and the output image is of a given size, in order to have the output image fit onto the photosensitive material, a determination is made of the appropriate scanning direction of the original image according to size of the output image and the size of the photosensitive material, and reading said original image after it rotates, if necessary.

9 Claims, 4 Drawing Sheets

IMAGE READING METHOD

BACKGROUND OF THE INVENTION

The present invention relates to an image reading method comprising the steps of reading an original image, signal-processing the read image and generating an output image, exposing a photosensitive material with an exposing signal, and using the output image as the exposing signal for the photosensitive material so as to prepare a printing plate.

The conventional image reading apparatus, has generally been a drum scanner which has an input drum, on which input drum an original to be read is affixed by pins or the like, and a scanner for reading the original as the drum rotates. In this conventional apparatus the read image is outputted onto photosensitive film material. In order to assure that the desired image will fit onto the film, the size of the film is calculated in order to estimate the position of the image on the output film, then the original is affixed to the input drum in a proper orientation to assure capture of the desired image. Consequently, there are problems such as loss of the output film and loss of efficiency due to the effort required for the operator's determining the optimum parameters of the scanning operation.

In addition to the conventional image reading apparatus of a drum scanner type, another conventional image reading apparatus is a flat bed type (plane scanning type) the flat bed reader gives little practically no consideration on how to read the desired image in an original with reference to the desired input size and the image output size of the original image. As a result, large loss is apt to be generated in the volume of the photosensitive material considered in outputting the entire original, as well as the scanning reading time of portions of an input original that are not desired.

SUMMARY OF THE INVENTION

The present invention problems of the conventional technology mentioned above. The object of the present invention, therefore, is to provide an image reading method, in which the scanning direction of an original image is determined on the basis of the sizes of output image and the photosensitive material, in order to obtain an effective reading of the image.

According to one aspect of the present invention, there is provided an image reading method, in a case that an original image is read by main scannings and auxiliary scannings of lines and the read image is exposed and outputted on a photosensitive material, determining a scanning direction of said original image according to size of comprising the steps of an output image and the size of said photosensitive material, rotating the original image if necessary, and reading said original image after.

The nature, principle and utility of the invention will become more apparent from the following detailed description when read in conjunction with the accompanying drawings.

PREFERRED EMBODIMENT OF THE INVENTION

Figure 1:
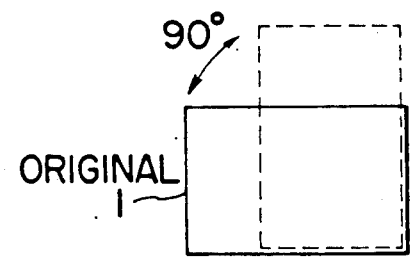
FIG. 1 and FIGS. 2A and 2B are charts to describe the principle of the present invention.

According to the image reading method of a preferred embodiment of the present invention, a color image on an original is separated in color and read by an image reading apparatus of the flat bed type for generating image signals. The image signals are effectively processed and used to expose a photosensitive material (output film). When printing plates of C (cyan), M (magneta), Y (yellow) and K (black) are simultaneously produced, the original is automatically rotated by 90° and scanned in order to minimize the scanning time for reading the original, considering the output sizes of images of C, M, Y and K to be exposed on the photosensitive material and the size (width) of the photosensitive material. Specifically, an original 1 is placed on a reading portion of the image reading apparatus so as to lay horizontally with its long side as shown in FIG. 1 by solid lines. If the scanning time can be made shorter when the original 1 is laid vertically with its short side as shown in FIG. 1 by dotted lines, considering the output size of the image and the size of the photosensitive material, it is useful to rotate the original 1 by 90° on the original base. It is, of course, possible to shorten the scanning time if the original 1 is placed or laid horizontally on its long side, the original 1 is read at a condition as shown in FIG. 1 by the solid lines.

Figure 2A:
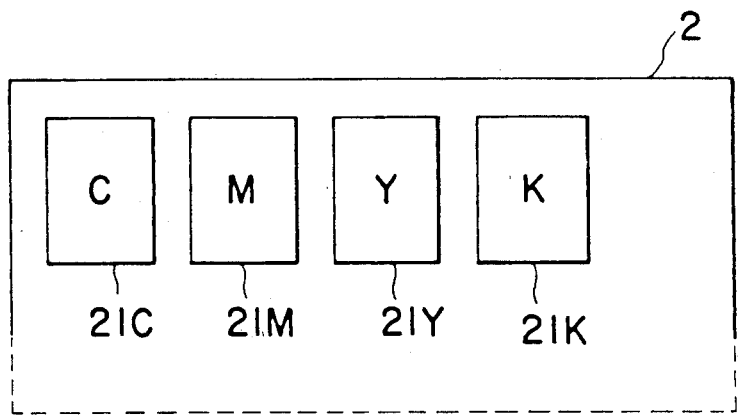
Figure 2B:
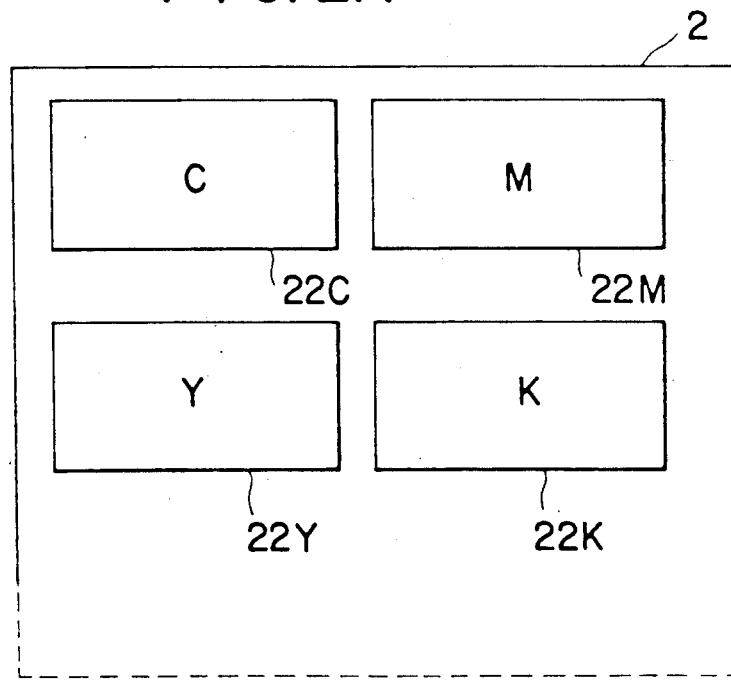

FIG. 2A shows the situation in which respective output originals 21C, 21M, 21Y, 21K of C, M, Y, K are simultaneously exposed on a photosensitive material 2 of a predetermined size, with the signals arranged vertically resting on their short sides. FIG. 2B shows another situation in which respective output images 22C, 22M, 22Y, 22K of C, M, Y, K are simultaneously exposed on the photosensitive material 2 when there is a horizontal placement of their long sides. Let it be assumed that the output images in FIG. 2A or FIG. 2B are exposed on the photosensitive material 2 under the same circumstances. When the original is horizontally oriented with respect to its long side as shown in FIG. 1 by the solid lines and is read by the image reading apparatus, the output images respectively are exposed in the orientation as shown in FIG. 2B. When the original is vertically placed at its short side as shown in FIG. 1 by the dotted lines and is read by the image apparatus, the output images are exposed in the orientation as shown in FIG. 2A. In order to read the original 1, the original 1 must be simultaneously separated in to colors of R, G, B so that all colors (C,M,Y,K) are outputted in the same direction. In other words, it is impossible to output images on the separated output images some of which are vertically oriented on their short sides and the rest are horizontally oriented on their long sides on the photosensitive material 2.

Figure 3:
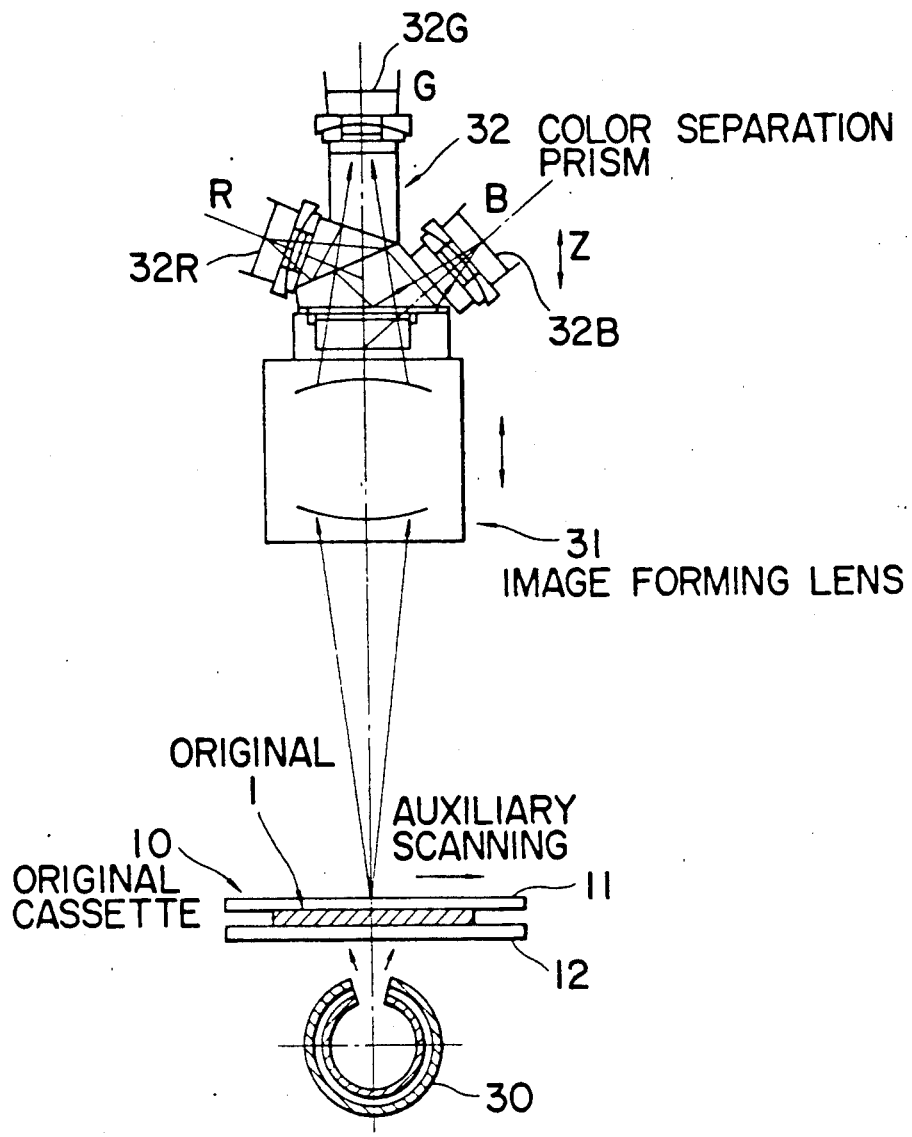
FIG. 3 is a constructive view of an image input portion according to the present inveniton.

FIG. 3 shows an optical system of an image input portion in the image reading apparatus, an original cassette 10 is received in a cassette receiver (which will be described hereinafter) and is illuminated by an aperture type fluorescent light 30 which has a linear shape and is placed under the original cassette 10. The original 1 of, for example, a color reversible film or the like sandwiched between transparent plates 11 and 12 is mounted in the original cassette 10. Image light passed through the original cassette 10 is inputted to an image forming lens 31 of a predetermined magnification and then to a color separation prism 32 connected to the image forming lens 31, and the light is separated into the three primary colors of R, G, B in the color separation prism 32. The separated light beams of the primary colors of R, G, B are inputted into image sensors 32R, 32G, 32B, respectively consisting of a CCD or the like and they are respectively converted into image signals of R, G, B.

Figure 4:
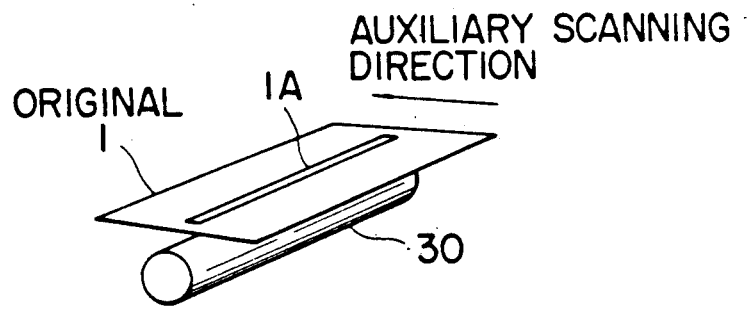
FIG. 4 depicts a view of the relationship of the main scanning to the auxiliary scanning.

FIG. 4 shows the positional relationship of the fluorescent light 30 and the original 1 during a scanning operation, and an area of the linear main scanning line 1A in the original 1 is read in the scanning operation. The whole image of the original 1 is read by relatively moving the linear main scanning line 1A to the direction of the auxiliary scanning.

Figure 5:
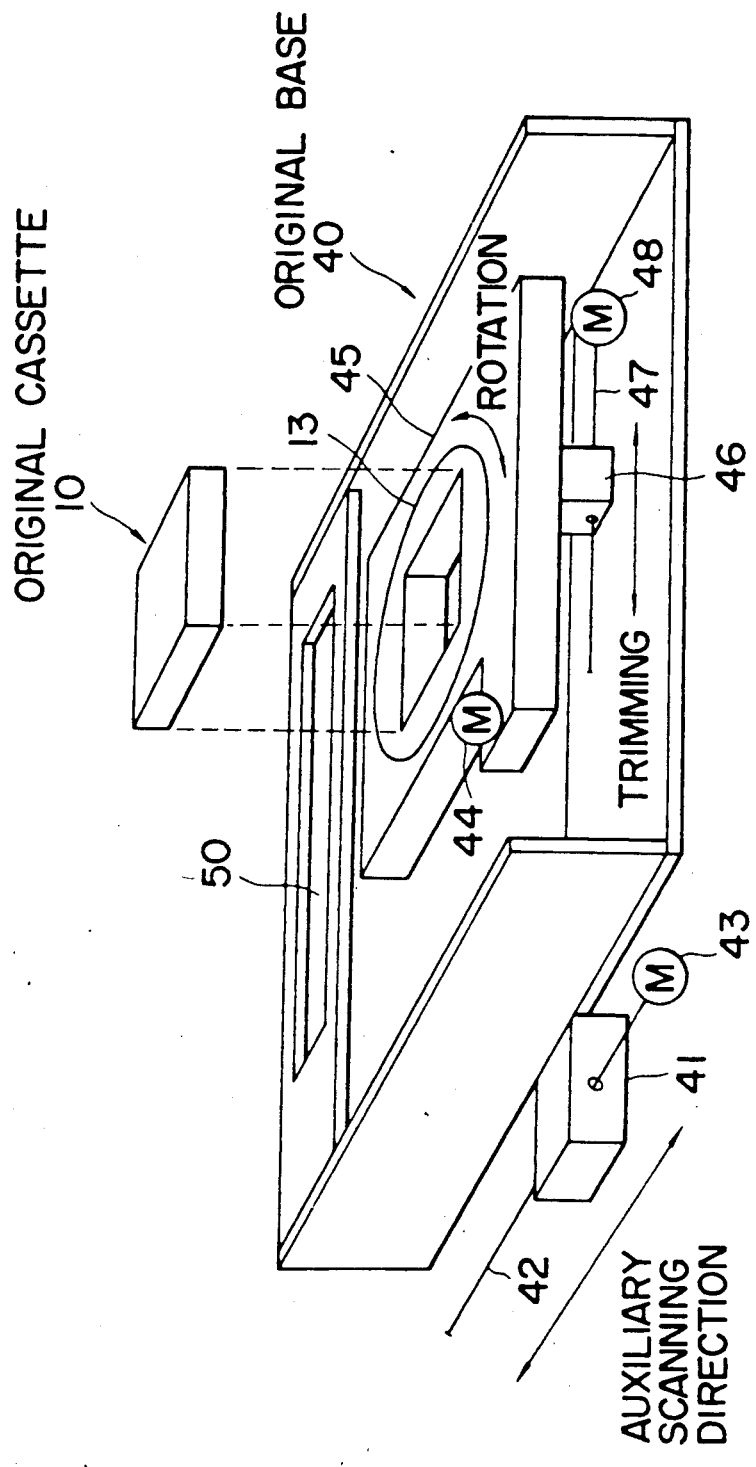
FIG. 5 shows a structure of the reading portion.

FIG. 5 shows an original base 40 of the image reading portion in which the original cassette 10 described above is used and depicts the construction of the original base 40. As shown in FIG. 5, the original base 40 has a box structure and is wholly scanned in the auxiliary scanning direction as shown by an arrow in FIG. 5 by a moving member 41 connected to the original base 40, a wire 42 joined to the moving member 41 and a motor 43. The original base 40 has a rotary base receiver 45 rotatable, in a direction as illustrated by the arrow, by a motor 44. The rotary base receiver 45 has a cassette receiver 13 to which the original cassette 10 is adapted. The entire structure of the rotary base receiver 45 is adapted to be moved or scanned in a trimming direction by means of a moving member 46 connected to the rotary base receiver 45, another wire 47 joined to the moving member 46 and a motor 48. These moving members 41 and 46 may be comprised by means of a mechanism of a screw and a nut. There is provided a correction region 50 on an upper surface of the original base 40, at its starting side in the auxiliary scanning direction which permits reading of a chart for adjusting the magnification at the reading-start instant of the image for adjust of the optical system.

Figure 6:
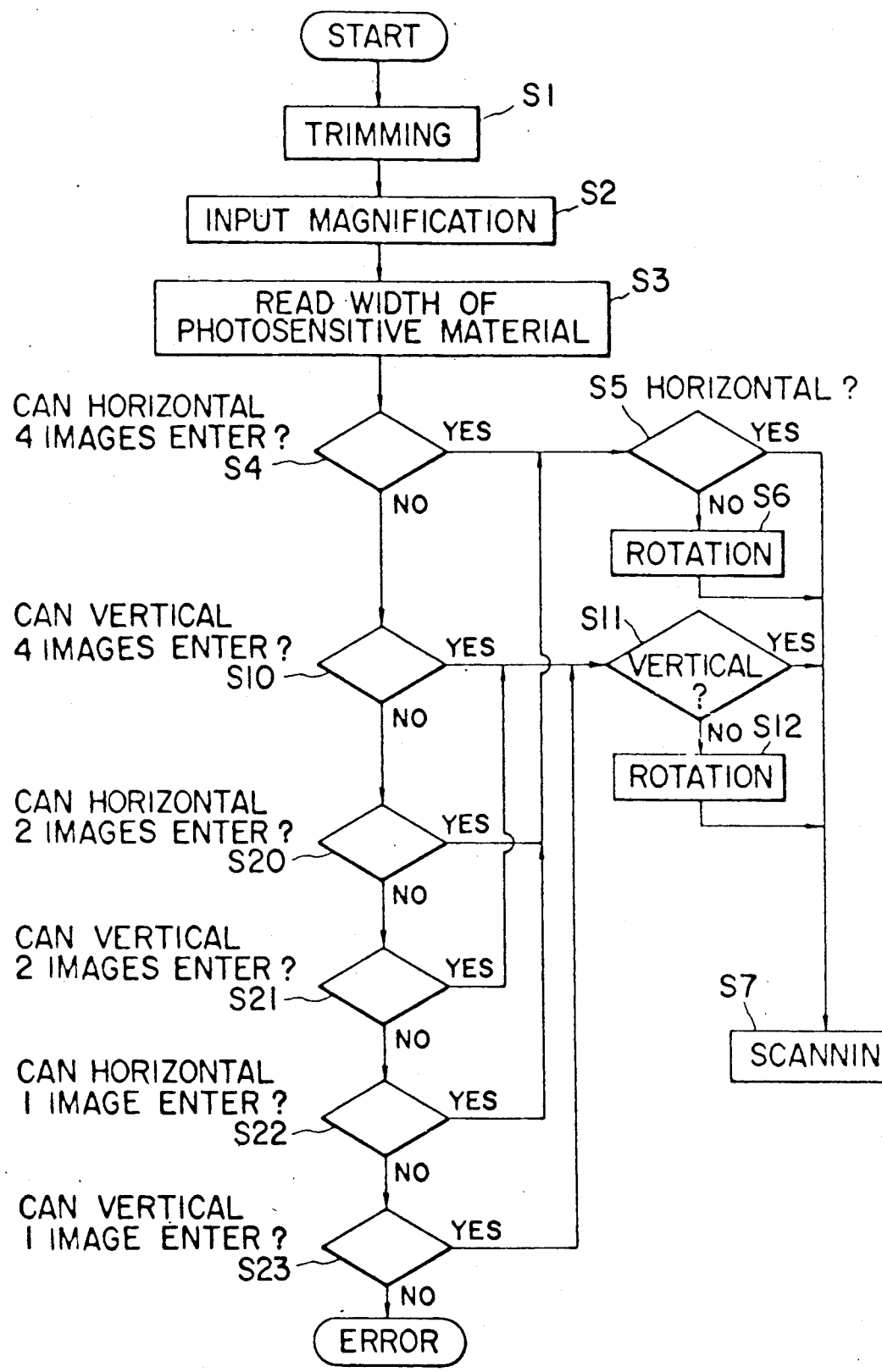
FIG. 6 is a flow chart showing examplified operation steps of the image reading method according to the present invention.

With respect to the image reading apparatus mentioned above, the reading direction (lengthwise, transverse) of the original 1 is determined by operating the apparatus according to a flow chart shown in FIG. 6. In detail, a trimming of the image reading apparatus is carried out by a driving of the motor 48 (Step S1), an output magnification is inputted through a keyboard or other input device (Step S2), and a width (size) of the photosensitive material mounted for the image output is read automatically or manually and then the resultant data of the reading is inputted (Step S3). Then, it is determined whether it is possible to enter the output images of C, M, Y, K in the photosensitive material at their long sides, in which condition the reading is carried out the most effectivity with respect to the output size of the image and the width of the photosensitive material (Step S4). When it is possible to horizontally enter the output images within the area of the photosensitive material, it is judged whether or not the original 1 set on the reading portion is horizontally oriented on its long side (Step S5). In a case that the original 1 is horizontally placed on its long side as shown in FIG. 1 by the solid lines, the various steps or processings described above are directly carried out and the original 1 is scanned (Step S7). If the original 1 is not horizontally placed at its long side or is vertically set as shown in FIG. 1 by the broken lines, the motor 44 is driven to rotate the original 1 by 90° (Step S6), situating it on its long side. After the above Step S6, the scanning is carried out.

If the four output originals do not enter in the area of the photosensitive material with a horizontal orientation with respect to their long sides, they are further judged as to whether they can enter the area of the photosensitive material vertically, as shown in FIG. 2A (Step S10). If these four output images can be entered, the set original 1 is judged as to whether it is on its or not short side (Step S11). When the original 1 is set vertically, a scanning is started directly. When the original 1 is oriented horizontally with respect to its long side, the motor 44 rotates to revolve the original cassette 10 of the original base 40 by 90°, this maneuver will orient the original 1 horizontally with respect; its short side. Then, a scanning of the original 1 can begin.

If the four output images oriented with respect to their short sides cannot vertically enter in the area of the photosensitive material 2, then it is judged whether only two output originals situated horizontally with respect to their long sides can can be entered or not (Step S20). When it is possible, the processing returns to the Steps S5 and it proceeds as previously described. On the contrary, if it is not possible it is judged whether two output images can be vertically entered or not at their short sides in the area of the photosensitive material (Step S21). When it is possible, the processing returns to the Step S11. When it is not possible, it is judged whether only one output image with a horizontal orientation with respect to the long side can enter in the area of the photosensitive material 2 or not (Step S22). If it is not possible, it is judged whether only one output image with a vertical orientation with respect to its short side can enter or not (Step S23), returning to the Step S5 or the Step S11. If only one output image with a vertical orientation with respect to its short side cannot enter in the area of the photosensitive material 2, it is judged an error since such situation is not likely to occur.

According to the image reading method of the present invention, it is possible to read images of the original with respect to various image output sizes and photosensitive materials in a manner which results in lessening or minimizing the image scanning time, improving the productivity and eliminating any loss of the photosensitive material. In addition, it is made possible to automate the image reading operation in the method according to the present invention.

It should be understood that many modifications and adaptations of the invention will become apparent to those skilled in the art and it is intended to encompass such obvious modifications and changes in the scope of the claims appended hereto.

What is claimed is:

1. An image reading method for printing an original image on a photosensitive material where an original image disposed on a planar surface is read by main scannings in a first direction and auxiliary scannings of lines in a second direction and the read image is outputted on a photosensitive material by exposure of an output image thereon, the method comprising the steps of:

inputting said original image, disposed on a planar surface, in a first orientation;

determining whether a scanning of said original image on said planar surface is preferred in said first orientation or a second orientation different from said first orientation according to the size of said output image and the size of said photosensitive material;

if said second orientation is preferred, rotating said planar surface having said original image disposed thereon so that said original image is in said second orientation; and reading said original image after said determining step and any rotation, if necessary.

2. An image reading method as claimed in claim 1, wherein the exposure is carried out for four output images of cyan (C), magenta (M), yellow (Y) and black (K).

3. An image reading method as claimed in claim 1, wherein said step of determining the scanning direction comprises selecting between a vertical or horizontal orientation and said rotating step comprises rotating said original image by rotation angle of 90°.

4. An image reading method as claimed in claim 1, wherein said original image is read in accordance with the main scannings and the auxiliary scannings of an image reading apparatus of a flat bed type.

5. The image reading method of claim 1 wherein said determining step comprises:

checking whether a first selected number of images can be entered on said photosensitive material in said first orientation; if entry in said first orientation can not be made, checking whether a first selected number of images can be entered on said photosensitive material in said second orientation, and if entry in said second orientation cannot be made, reducing said first selected number of images to a second selected number of images, and repeating said checking and reducing steps a predetermined number of times until it is determined that a selected number of images can be entered on said photosensitive material at a first or second orientation and identifying said orientation as preferred.

6. The image reading method of claim 5 further comprising, controlling execution of said rotating step so that said image is in said preferred first or second orientation for reading.

7. The image reading method of claim 5 wherein said determining step comprises initially determining whether said image has a horizontal or vertical orientation.

8. The image reading method of claim 5 wherein said first number of images is 4 and comprises the image for C, Y, M and K.

9. The image reading method of claim 8, further comprising repeating said checking steps until said selected number of images is equal to one.

* * * * *